United States Patent [19]

Hague et al.

[11] Patent Number: 5,696,710

[45] Date of Patent: Dec. 9, 1997

[54] APPARATUS FOR SYMMETRICALLY REDUCING N LEAST SIGNIFICANT BITS OF AN M-BIT DIGITAL SIGNAL

[75] Inventors: John Alan Hague; Greg Alan Kranawetter; Donald Henry Willis, all of Indianapolis, Ind.

[73] Assignee: Thomson Consumer Electronics, Inc., Indianapolis, Ind.

[21] Appl. No.: 581,115

[22] Filed: Dec. 29, 1995

[51] Int. Cl.[6] .................................................. G06F 7/38
[52] U.S. Cl. .................................................. 364/745.02
[58] Field of Search .......................................... 364/745

[56] References Cited

U.S. PATENT DOCUMENTS

| | | | |
|---|---|---|---|
| 4,589,084 | 5/1986 | Fling et al. | 364/745 |
| 4,727,506 | 2/1988 | Fling | 364/745 |
| 4,750,146 | 6/1988 | Dalqvist et al. | 364/745 |
| 4,755,961 | 7/1988 | Kuriki et al. | 364/745 |
| 4,831,576 | 5/1989 | Kunimoto | 364/745 |
| 4,965,668 | 10/1990 | Abt et al. | 364/745 |
| 5,218,563 | 6/1993 | Juri et al. | 364/745 |
| 5,463,570 | 10/1995 | Nakata | 364/745 |

*Primary Examiner*—Tan V. Mai
*Attorney, Agent, or Firm*—Joseph S. Tripoli; Peter M. Emanuel; Richard G. Coalter

[57] ABSTRACT

An M-bit digital signal, the most significant bit (MSB) thereof and an integer K are added to produce a sum which is truncated by N least significant bits to provide a symmetrically rounded bit-reduced digital output signal. The MSB may be applied in true or complemented form to the adder for selecting wide or narrow rounding modes having different numbers of output zeros disposed about a point of symmetry for a given input signal change. Advantageously, undesirable direct current (DC) shifts due to least significant bit (LSB) reduction in digital video, audio or similar applications are prevented.

6 Claims, 9 Drawing Sheets

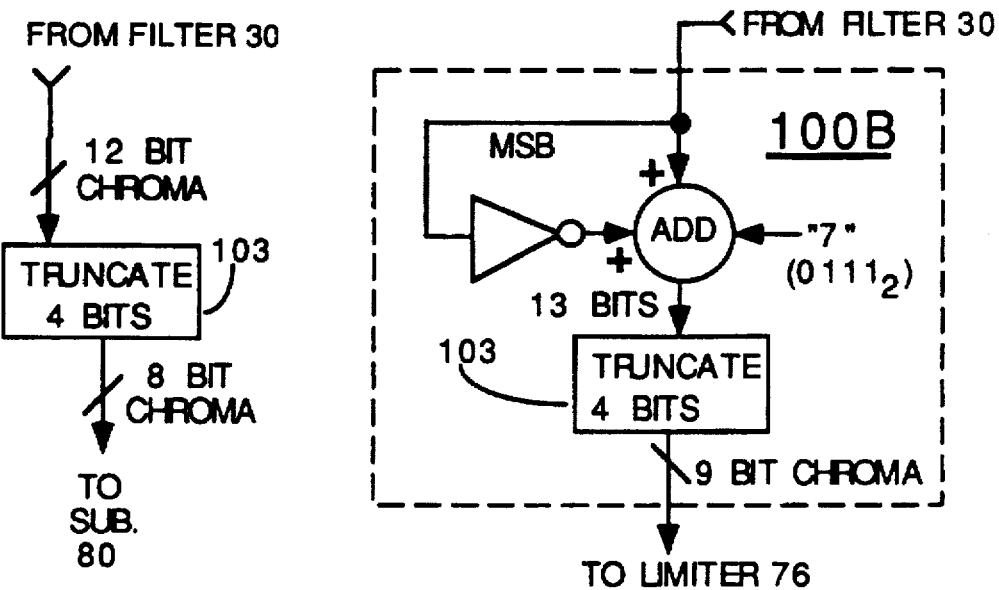
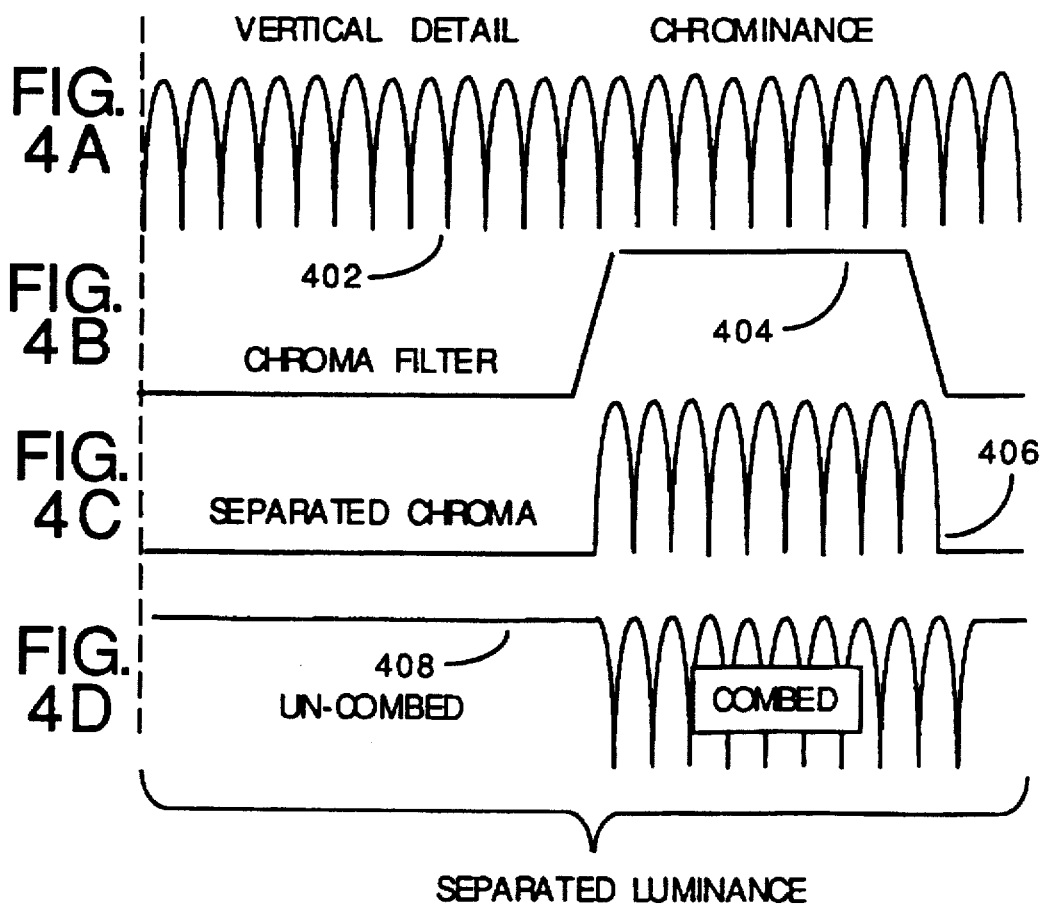
FIG. 2   FIG. 3
FIG. 4A
FIG. 4B
FIG. 4C
FIG. 4D

FIG. 5

| A/D OUTPUT SIGNALS FOR 5 LINES | |
|---|---|
| SIGNAL ONE | LINE 1: 7  2  4  9  7  2  4  9  7  2<br>LINE 2: 4  9  7  2  4  9  7  2  4  9<br>LINE 3: 7  2  4  9  7  2  4  9  7  2 |
| SIGNAL TWO | LINE 1: 7  2  4 10  7  2  4 10  7  2<br>LINE 2: 4 10  7  2  4 10  7  2  4 10<br>LINE 3: 7  2  4 10  7  2  4 10  7  2 |
| SIGNAL THREE | LINE 1: 7  2  5 10  7  2  5 10  7  2<br>LINE 2: 5 10  7  2  5 10  7  2  5 10<br>LINE 3: 7  2  5 10  7  2  5 10  7  2 |
| SIGNAL FOUR | LINE 1: 7  3  5 10  7  3  5 10  7  3<br>LINE 2: 5 10  7  3  5 10  7  3  5 10<br>LINE 3: 7  3  5 10  7  3  5 10  7  3 |
| SIGNAL FIVE | LINE 1: 8  3  5 10  8  3  5 10  8  3<br>LINE 2: 5 10  8  3  5 10  8  3  5 10<br>LINE 3: 8  3  5 10  8  3  5 10  8  3 |

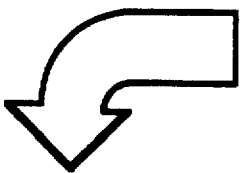

FIG. 6

CHROMINANCE COMB 20 OUTPUT   $D = L_n - L_{n-1}$

| SIGNAL ONE | LINE 2  -3  +7  +3  -7  -3  +7  +3  -7<br>LINE 3  +3  -7  -3  +7  +3  -7  -3  +7 |
|---|---|
| SIGNAL TWO | LINE 2  -3  +8  +3  -8  -3  +8  +3  -8<br>LINE 3  +3  -8  -3  +8  +3  -8  -3  +8 |
| SIGNAL THREE | LINE 2  -2  +8  +2  -8  -2  +8  +2  -8<br>LINE 3  +2  -8  -2  +8  +2  -8  -2  +8 |
| SIGNAL FOUR | LINE 2  -2  +7  +2  -7  -2  +7  +2  -7<br>LINE 3  +2  -7  -2  +7  +2  -7  -2  +7 |
| SIGNAL FIVE | LINE 2  -3  +7  +3  -7  -3  +7  +3  -7<br>LINE 3  +3  -7  -3  +7  +3  -7  -3  +7 |

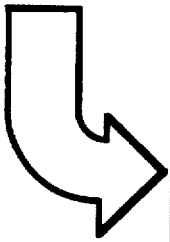

CHROMA BAND-PASS FILTER 30 OUTPUT

| SIGNAL ONE | LINE 2  -24  +56  +24  -56  -24  +56  +24<br>LINE 3  +24  -56  -24  +56  +24  -56  -24 |
|---|---|
| SIGNAL TWO | LINE 2  -24  +64  +24  -64  -24  +64  +24<br>LINE 3  +24  -64  -24  +64  +24  -64  -24 |
| SIGNAL THREE | LINE 2  -16  +64  +16  -64  -64  +64  +16<br>LINE 3  +16  -64  -16  +64  +16  -64  -16 |
| SIGNAL FOUR | LINE 2  -16  +56  +16  -56  -16  +56  +16<br>LINE 3  +16  -56  -16  +56  +16  -56  -16 |
| SIGNAL FIVE | LINE 2  -24  +56  +24  -56  -24  +56  +24<br>LINE 3  +24  -56  -24  +56  +24  -56  -24 |

CHROMINANCE PRODUCED BY "SIMPLE" TRUNCATION

| SIGNAL ONE | LINE 2 | -2 +3 +1 -4 -2 +3 +1 -4 -2 +3 +1 -4 |
| | LINE 3 | +1 -4 -2 +3 +1 -4 -2 +3 +1 -4 -2 +3 |
| SIGNAL TWO | LINE 2 | -2 +4 +1 -4 -2 +4 +1 -4 -2 +4 +1 -4 |
| | LINE 3 | +1 -4 -2 +4 +1 -4 -2 +4 +1 -4 -2 +4 |
| SIGNAL THREE | LINE 2 | -1 +4 +1 -4 -1 +4 +1 -4 -1 +4 +1 -4 |
| | LINE 3 | +1 -4 -1 +4 +1 -4 -1 +4 +1 -4 -1 +4 |
| SIGNAL FOUR | LINE 2 | -1 +3 +1 -4 -1 +3 +1 -4 -1 +3 +1 -4 |
| | LINE 3 | +1 -4 -1 +3 +1 -4 -1 +3 +1 -4 -1 +3 |
| SIGNAL FIVE | LINE 2 | -2 +3 +1 -4 -2 +3 +1 -4 -2+3 +1 -4 |
| | LINE 3 | +1 -4 -2 +3 +1 -4 -2+3 +1 -4 -2 +3 |

FIG. 8

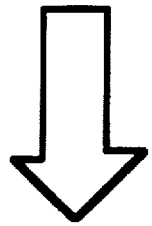

FIG. 9

LUMINANCE OUTPUT USING "SIMPLE" CHROMA TRUNCATION (OF FIG. 8)

| SIGNAL ONE | LINE 2 | +6 +6 +6 +6 +6 +6 +6 +6 +6 +6 +6 |
| | LINE 3 | +6 +6 +6 +6 +6 +6 +6 +6 +6 +6 +6 |
| SIGNAL TWO | LINE 2 | +6 +6 +6 +6 +6 +6 +6 +6 +6 +6 +6 |
| | LINE 3 | +6 +6 +6 +6 +6 +6 +6 +6 +6 +6 +6 |
| SIGNAL THREE | LINE 2 | +6 +6 +6 +6 +6 +6 +6 +6 +6 +6 +6 |
| | LINE 3 | +6 +6 +6 +6 +6 +6 +6 +6 +6 +6 +6 |
| SIGNAL FOUR | LINE 2 | +6 +7 +6 +7 +6 +7 +6 +7 +6 +7 +6 |
| | LINE 3 | +6 +7 +6 +7 +6 +7 +6 +7 +6 +7 +6 |
| SIGNAL FIVE | LINE 2 | +7 +7 +7 +7 +7 +7 +7 +7 +7 +7 +7 |
| | LINE 2 | +7 +7 +7 +7 +7 +7 +7 +7 +7 +7 +7 |

CHROMINANCE PRODUCED BY SYMMETRICAL ROUNDING OF FIG. 1

| SIGNAL ONE | LINE 2   -1 +3 +1 -3 -1 +3 +1 -3 -1 +3<br>LINE 3   +1 -3 -1 +3 +1 -3 -1 +3 +1 -3 |
|---|---|
| SIGNAL TWO | LINE 2   -1 +4 +1 -4 -1 +4 +1 -4 -1 +4<br>LINE 3   +1 -4 -1 +4 +1 -4 -1 +4 +1 -4 |
| SIGNAL THREE | LINE 2   -1 +4 +1 -4 -1 +4 +1 -4 -1 +4<br>LINE 3   +1 -4 -1 +4 +1 -4 -1 +4 +1 -4 |
| SIGNAL FOUR | LINE 2   -1 +3 +1 -3 -1 +3 +1 -3 -1 +3<br>LINE 3   +1 -3 -1 +3 +1 -3 -1 +3 +1 -3 |
| SIGNAL FIVE | LINE 2   -1 +3 +1 -3 -1 +3 +1 -3 -1 +3<br>LINE 3   +1 -3 -1 +3 +1 -3 -1 +3 +1 -3 |

FIG. 10

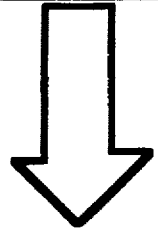

FIG. 11

LUMINANCE OUTPUT USING SYMMETRICAL ROUNDING OF FIG. 1

| SIGNAL ONE | LINE 2   +5 +6 +6 +5 +5 +6 +6 +5 +5 +6 +6<br>LINE 3   +6 +6 +5 +5 +6 +6 +5 +5 +6 +6 +5 |
|---|---|
| SIGNAL TWO | LINE 2   +5 +6 +6 +6 +5 +6 +6 +6 +5 +6 +6<br>LINE 3   +6 +6 +5 +6 +6 +6 +5 +6 +6 +6 +5 |
| SIGNAL THREE | LINE 2   +6 +6 +6 +6 +6 +6 +6 +6 +6 +6 +6<br>LINE 3   +6 +6 +6 +6 +6 +6 +6 +6 +6 +6 +6 |
| SIGNAL FOUR | LINE 2   +6 +7 +6 +6 +6 +7 +6 +6 +6 +7 +6<br>LINE 3   +6 +6 +6 +7 +6 +6 +6 +7 +6 +6 +6 |
| SIGNAL FIVE | LINE 2   +6 +7 +7 +6 +6 +7 +7 +6 +6 +7 +7<br>LINE 3   +7 +6 +6 +7 +7 +6 +6 +7 +7 +6 +6 |

"WIDE" SYMMETRICAL ROUNDING (N=2, 5 zeros)

| (A) INPUT DECIMAL M | (B) M-BIT BINARY M | (C) MSB | (D) K=[(2^N)-2]/2 K for N=2 | (E) ADDER SUM "M"+MSB+"K" | (F) TRUNCATED -2 LSB | (G) DEC OUT |
|---|---|---|---|---|---|---|
| +11 | 01011 | 0 | 1 | 01100 | 101 | 3 |
| +10 | 01010 | 0 | 1 | 01011 | 010 | 2 |
| +9  | 01001 | 0 | 1 | 01010 | 010 | 2 |
| +8  | 01000 | 0 | 1 | 01001 | 010 | 2 |
| +7  | 00111 | 0 | 1 | 01000 | 010 | 2 |
| +6  | 00110 | 0 | 1 | 00111 | 001 | 1 |
| +5  | 00101 | 0 | 1 | 00110 | 001 | 1 |
| +4  | 00100 | 0 | 1 | 00101 | 001 | 1 |
| +3  | 00011 | 0 | 1 | 00100 | 001 | 1 |
| +2  | 00010 | 0 | 1 | 00011 | 000 | 0 |
| +1  | 00001 | 0 | 1 | 00010 | 000 | 0 |
| 0   | 00000 | 0 | 1 | 00001 | 000 | 0 |
| -1  | 11111 | 1 | 1 | 00001 | 000 | 0 |
| -2  | 11110 | 1 | 1 | 00000 | 000 | 0 |
| -3  | 11101 | 1 | 1 | 11111 | 111 | -1 |
| -4  | 11100 | 1 | 1 | 11110 | 111 | -1 |
| -5  | 11011 | 1 | 1 | 11101 | 111 | -1 |
| -6  | 11010 | 1 | 1 | 11101 | 111 | -1 |
| -7  | 11001 | 1 | 1 | 11011 | 110 | -2 |
| -8  | 11000 | 1 | 1 | 11010 | 110 | -2 |
| -9  | 10111 | 1 | 1 | 11001 | 110 | -2 |
| -10 | 10110 | 1 | 1 | 11000 | 110 | -2 |
| -11 | 10101 | 1 | 1 | 10111 | 101 | -3 |

FIG. 13

NARROW SYMMETRICAL ROUNDING (N=2,3 zeros)

| (A) INPUT DECIMAL M | (B) M-BIT BINARY M | (C) CARRY IN INVERT (MSB) | (D) K={(2^N)-2}/2 K for N=2 | (E) ADDER SUM "M"+"K"+INVTD MSB | (F) TRUNCATE -2 LSB | (G) DEC OUT |
|---|---|---|---|---|---|---|
| +11 | 01011 | 1 | 1 | 01101 | 011 | +3 |
| +10 | 01010 | 1 | 1 | 01100 | 011 | +3 |
| +9 | 01001 | 1 | 1 | 01011 | 010 | +2 |
| +8 | 01000 | 1 | 1 | 01010 | 010 | +2 |
| +7 | 00111 | 1 | 1 | 01001 | 010 | +2 |
| +6 | 00110 | 1 | 1 | 01000 | 010 | +2 |
| +5 | 00101 | 1 | 1 | 00111 | 001 | +1 |
| +4 | 00100 | 1 | 1 | 00110 | 001 | +1 |
| +3 | 00011 | 1 | 1 | 00101 | 001 | +1 |
| +2 | 00010 | 1 | 1 | 00100 | 001 | +1 |
| +1 | 00001 | 1 | 1 | 00011 | 000 | 0 |
| 0 | 00000 | 1 | 1 | 00010 | 000 | 0 |
| -1 | 11111 | 0 | 1 | 00000 | 000 | 0 |
| -2 | 11110 | 0 | 1 | 11111 | 111 | -1 |
| -3 | 11101 | 0 | 1 | 11110 | 111 | -1 |
| -4 | 11100 | 0 | 1 | 11101 | 111 | -1 |
| -5 | 11011 | 0 | 1 | 11100 | 111 | -1 |
| -6 | 11010 | 0 | 1 | 11011 | 110 | -2 |
| -7 | 11001 | 0 | 1 | 11010 | 110 | -2 |
| -8 | 11000 | 0 | 1 | 11001 | 110 | -2 |
| -9 | 10111 | 0 | 1 | 11000 | 110 | -2 |
| -10 | 10110 | 0 | 1 | 10111 | 101 | -3 |
| -11 | 10101 | 0 | 1 | 10110 | 101 | -3 |

APPARATUS FOR SYMMETRICALLY REDUCING N LEAST SIGNIFICANT BITS OF AN M-BIT DIGITAL SIGNAL

FIELD OF THE INVENTION

This invention relates to bit reduction of binary signals and particularly to the symmetrical reduction of a number of least significant bits of a digital signal.

BACKGROUND OF THE INVENTION

The present apparatus is of general utility in applications requiring a reduction in the number of least significant bits of a digital signal without tending to introduce a DC component in the modified signal. This process will be referred to herein as "symmetrical truncation" or "symmetrical rounding" or "symmetrical bit reduction" of digital signals.

In digital signal processing applications a signal may be subjected to a number of additions, subtraction's or other arithmetic operations. Such processes can produce results which have more bit positions that the original digital signal. Addition of two 8-bit binary numbers, for example, can produce a 9-bit sum since a "carry-out" may occur. The same is true for subtraction since a "borrow" may occur. The difficulty is that as more processing is performed, the circuit elements must handle more and more bits thus increasing the processing cost and complexity and presenting potential timing problems for carry or borrow bit propagations. In order to constrain the circuitry to a manageable size, the LSB's are often discarded, i.e., the binary numbers are truncated.

Conventional "truncation" of binary signals involves discarding some of the least significant bits (LSB's) of the binary signal. This presents a problem in that simple truncation produces an asymmetry between positive truncated numbers and negative truncated numbers. Truncation of positive numbers produces numbers which tend toward zero whereas truncation of negative numbers produces numbers which tend toward more negative numbers.

As an example, truncating the binary equivalent of the decimal number with peak values of plus or minus 13 by simply discarding the two LSB's produces the values of +3 and −4 for the positive and negative numbers, respectively. Now suppose that the original signal (plus and minus 13) represents the peak values of a digital signal corresponding to a sinusoid centered about zero volts. It will readily be appreciated that "simple" truncation by discarding the LSB's of such a signal will introduce a "bias" or a direct current (DC) component or "shift" in the truncated signal. In some applications the DC shift may be insignificant relative to the magnitude of the average or peak signal levels. However, in other systems such asymmetry may produce undesirable results and must be avoided.

A solution to the foregoing problems with conventional truncation is described by Fling et al. in their U.S. Pat. No. 4,589,084 entitled APPARATUS FOR SYMMETRICALLY TRUNCATING TWO'S COMPLEMENT BINARY SIGNALS AS FOR USE WITH INTERLEAVED QUADRATURE SIGNALS which issued 13 May 1986. In examples of the Fling et al. apparatus, two's complement numbers are truncated in a symmetrical manner so that the "symmetrically truncated" values of both positive and negative numbers tend toward zero. Responsive to the sign bit of the two's complement number, the apparatus truncates positive values by simply discarding the N LSB's. When the sign bit indicates the presence of a negative number, the N LSB's are OR'ed together with a the result being added to the LSB's of the remaining (M-N) bits of the negative binary number.

SUMMARY OF THE INVENTION

The present invention is directed to meeting a need for simplification symmetrically reducing the number of least significant bits of a digital signal.

Apparatus for symmetrically reducing a given number N of least significant bits of an M-bit input signal, in accordance with the invention, comprises a full adder for adding the M-bit input signal, the MSB thereof and an integer K to produce a sum signal; and a truncator for truncating the sum signal by N bits to provide a symmetrically rounded output signal having N fewer LSB's.

BRIEF DESCRIPTION OF THE DRAWING

The foregoing and further features of the invention are illustrated in the accompanying drawing, wherein like elements are denoted by like reference characters, and in which:

FIG. 2 is a block diagram illustrating a conventional method of bit reduction by simple truncation which may produce an unwanted DC offset in the truncated signal;

FIG. 3 is a block diagram illustrating a modification of a symmetrical rounding apparatus of FIG. 1 for altering the width of a zone of symmetry in accordance with a feature of the invention;

FIGS. 4A–4D are filter diagrams illustrating operation of the composite video separation apparatus of FIG. 1;

FIG. 5 is a spatial pixel diagram illustrating five assumed input composite video signal conditions for the apparatus of FIG. 1;

FIG. 6 is a diagram, derived from FIG. 5, illustrating comb filter output signal values inclusive of a vertical detail component and a chrominance component for the five assumed input signal conditions of FIG. 5;

FIG. 7 is a diagram, derived from FIG. 6, illustrating chrominance component signal values separated from the vertical detail component and prior to bit reduction, for the apparatus of FIG. 1;

FIG. 8 is a pixel diagram, derived from FIG. 7 and illustrating separated chrominance signal values produced after bit reduction by straight truncation as in FIG. 2;

FIG. 9 is a luminance signal diagram, derived from FIG. 8, and illustrating luminance signal values for the five assumed signal conditions of FIG. 4 under the assumption of bit reduction by means of straight truncation as shown in FIG. 2;

FIG. 10 is a pixel diagram, derived from FIG. 7 and illustrating separated chrominance signal values produced after bit reduction in the embodiment of the invention in FIG. 1; and FIG. 11 is a luminance signal diagram, derived from FIG. 10, illustrating luminance signal values for the five assumed signal conditions of FIG. 4 and obtained by use of symmetrical bit reduction as in the example of FIG. 1;

FIG. 13 is a tabular diagram of a transfer function illustrating "wide" symmetrical rounding in the example of FIG. 1 for a case of 2-bit rounding with 5 zeros disposed about a point of symmetry (POS);

FIG. 14 is a tabular diagram of a transfer function illustrating "narrow" symmetrical rounding in the example of FIG. 1 for a case of 2-bit rounding with 3 zeros disposed about a point of symmetry (POS)

DETAILED DESCRIPTION

Figure 1:
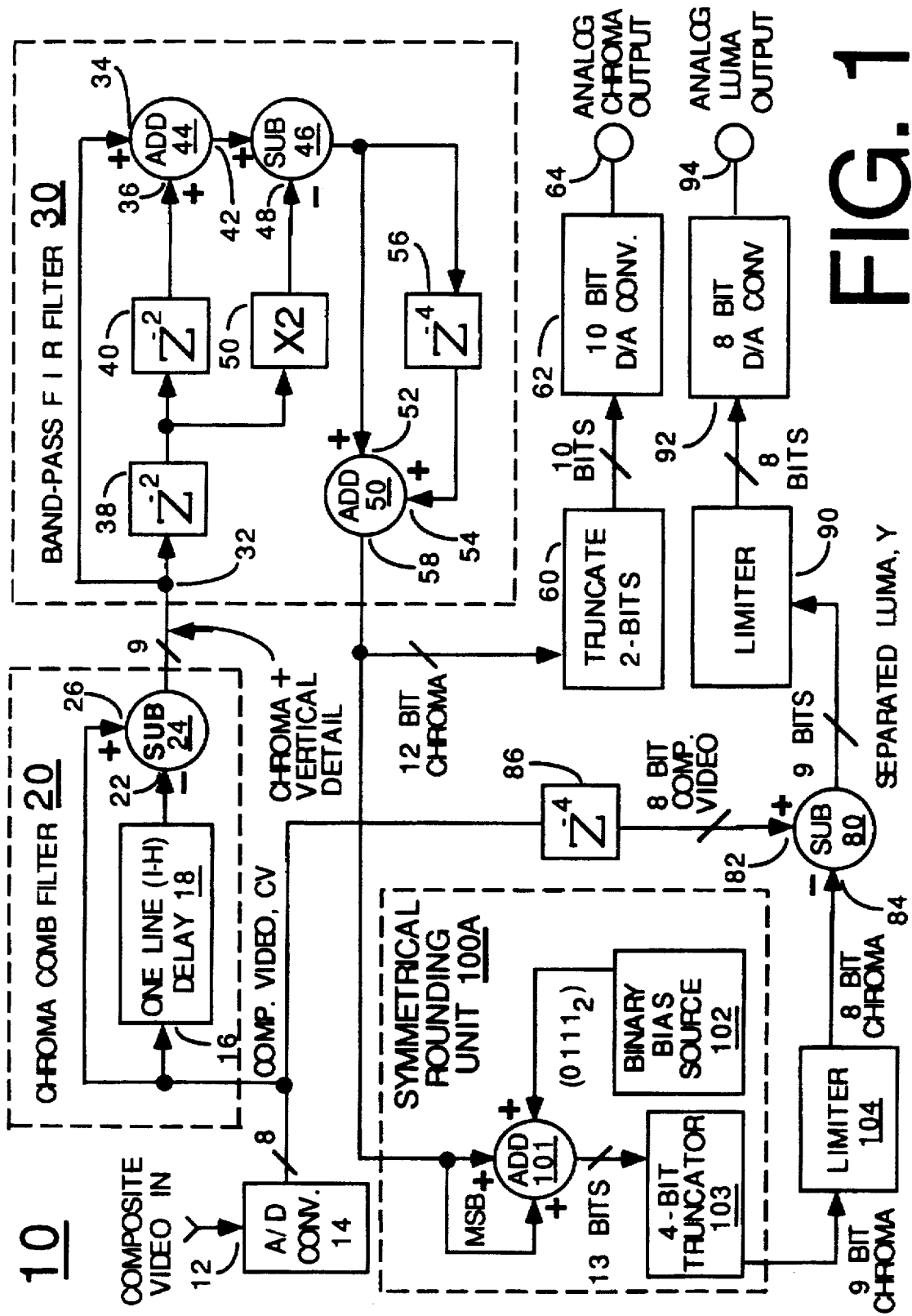
FIG. 1 is a block diagram of symmetrical rounding apparatus in accordance with the invention in an exemplary application for separating a digital composite video signal into luminance and chrominance components.

FIG. 1 illustrates an exemplary application of a symmetrical "rounding" or "bit reduction" unit 100A embodying the invention in an application for separating a composite video input signal into luminance and chrominance components.

The composite video signal separator 10 of FIG. 1 comprises an analog to digital (A/D) converter 14 having an input 12 for receiving an analog composite video input signal to be separated into luminance and chrominance components and having an output for providing a digital composite video (CV) output signal of, illustratively, 8-bits resolution. Also, for purposes of illustration, it will be assumed that the composite video signal is of the NTSC standard and that the A/D converter sampling rate is equal to four times the frequency of the color subcarrier. Under these conditions there will be 4 sample intervals for one complete color cycle, 2 sample intervals equals one-half of one color cycle and there will be a total of 910 samples per line. A drawing convention used in FIG. 1 is that a 45 degree hash mark drawn through a line and having a number beside it indicates that the line is a bus and the number indicates bus conductors (this also indicates the number of bits per sample).

After conversion to digital form, the composite video signal CV is applied to a pair of linear digital filters 20 and 30 which produce the chrominance component C from the composite video signal CV. The first filter 20 is a one line (1-H) comb filter in which the composite video signal is applied directly to the minuend (+) input 26 of a subtractor 24 and is applied via a one line (1-H) delay (e.g., 910 sample intervals or clock periods) 18 to the subtrahend (−) input 22 of subtractor 24. By subtracting the delayed composite video signal CV from the undelayed composite video signal, the subtractor produces a combed filter response having the periodic passband response as shown in FIG. 4A (not to scale).

The comb response of FIG. 4A exhibits peaks at odd multiples of one half the horizontal line rate (e.g., Fh/2, 3Fh/2, 5Fh/2, etc.) and exhibits nulls at multiples of the line rate (e.g., Fh, 2Fh, 3Fh, etc.). This response recovers two signals from the composite video signal CV. At frequencies centered about the color subcarrier frequency, the comb output signal comprises mainly chrominance components (C1) substantially free of luminance components. At frequencies below the lower band edge of the chrominance signal band the comb output comprises what is commonly called the "vertical detail" component (VD) of the luminance signal. This signal conveys information regarding line to line luminance structure and contains essentially no chrominance information at all.

To recover the chrominance component alone, the vertical detail signal component (VD) from the comb filter 20 must be removed. This is done by a three stage, band-pass, finite impulse response (FIR) filter 30 having an input 32 to which the combed chrominance and vertical detail signals (C1+ VD) are applied. Filter 30 comprises a first adder 44 having a first input 34 directly coupled to the input 32 and a second input 36 coupled to the input 32 via a series connection of two delay element 40 and 38, each having a delay of two sample intervals. Delay is signified in the drawing by conventional "Z" transform notation in which the negative exponent of "Z" signifies a number of sample interval delays. The delayed signal at the common connection of delays 38 and 40 is multiplied by two in multiplier 50 (e.g., a one bit shift) and applied to the subtrahend (−) input of a subtractor 46 which subtracts the delayed and multiplied signal from the output 42 of adder 44.

A final stage of filtering in FIR filter 30 is provided by a filter formed by an adder 50 having a first input 52 directly connected to the output of subtractor 46 and having a second input 54 coupled to the output of subtractor 46 via a four sample delay element 56. The combination of the first two delay elements 38 and 40 and adder 44 forms a first band pass filter. The combination of multiplier 50 and subtractor 46 with the first band pass filter forms a second band pass filter. The third filter stage is formed by adder 50 and delay element 56, as previously noted, and all of the filters have poles centered at the chrominance carrier frequency. These filters have been found sufficient to remove the vertical detail component produced by comb filter 20 and so the chrominance output signal C58 produced at the output of adder 50 is free of significant luminance vertical detail components.

FIGS. 4A-4D illustrate the overall composite video separation process. FIG. 4A illustrates the periodic comb filter response of filter 20 as previously discussed. FIG. 4B illustrates the pass-band of the filter 30 which removes the vertical detail component from the output of filter 20 leaving only the chrominance component as shown in FIG. 4C. Ultimately, as will be explained later, this component is subtractively combined with the composite video signal CV to essentially cancel the chrominance component thus leaving only the luminance component as illustrated in FIG. 4D.

During the process of filtering the composite video signal CV to obtain chrominance, the signal is subjected to a total of four (4) arithmetic operations. For example, in comb filter 20 the delayed and direct composite video signals were subtracted. This "extends" or increases the number of bits of the resultant difference signal by one bit since it is possible that subtractor 26 may produce a "borrow". Accordingly, the combed chrominance signal is 9 bits wide at the subtractor 24 output. This is signified in the drawing by the "hash" line drawn through the output bus of subtractor 24 with the number "9" written beside it. Other signal buses are similarly identified as to the bus "width". Some signals also include an indication of the number of bits concerned.

In the FIR filter 30 the chrominance component is subjected to a total of three arithmetic operations in adders 34 and 50 and subtractor 46. Each arithmetic operation adds another bit to the chrominance signal because the operation may produce either a carry (for adders) or a borrow (for subtractors). Accordingly, the 8-bit composite video signal applied to comb filter 20 is "extended" to a 9-bit signal after the first subtraction. The 9 bit signal becomes 10 bits after the first addition in adder 44. The output of adder 44 becomes an 11-bit signal due to the second subtraction in subtractor 46 and finally the fully filtered chrominance signal has extended to 12 bits after the final addition in adder 50. The extension of the chrominance signal from 8 bits to 12 bits is similar to having multiplied the chrominance signal by a factor of sixteen (16). In a presently preferred application of the invention, the "bit-extended" chrominance signal of 12 bits is "bit-reduced" to 10 bits by a 2-bit truncator 60 and converted by a 10 bit D/A converter 62 for application as an analog output signal to output terminal 64.

Luminance signal recovery requires different chrominance signal processing. Specifically, the technique of bit reduction by simple "truncation" or "chopping off" the lower bits for chroma presents a problem with regard to recovery of the luminance signal component. It has been found that the luminance signal tends to produce undesirable visual artifacts in displayed images when one attempts to reduce the number of chrominance signal bits by simple truncation. It has been found that these artifacts, including contouring, become apparent when displaying images having very low luminance and chrominance spatial gradients. Examples of such signals are discussed later.

Luminance signal recovery requires reduction of the number of chrominance bits to match the resolution (8-bits) of the composite video signal. This requires reducing the chrominance component from 12 bits to 8 bits without introducing any DC component into the bit reduced signal. This bit reduction is achieved, in accordance with an aspect of the invention, by what is herein termed "symmetrical rounding". It is herein recognized that the processes of symmetrical rounding of the chrominance signal advantageously reduces a tendency toward undesirable contouring in the luminance signal.

An example of a conventional symmetrical "rounding" or "truncation" circuit is described by Fling et al. in their U.S. Pat. No. 4,589,084 entitled APPARATUS FOR SYMMETRICALLY TRUNCATING TWO'S COMPLEMENT BINARY SIGNALS AS FOR USE WITH INTERLEAVED QUADRATURE SIGNALS which issued 13 May 1986. In the Fling et al. apparatus symmetrical truncation of two's complement binary numbers is performed by simply discarding the LSB,s of positive values and by adding "one" to the truncated negative value when any one of the discarded LSB's is a logical "one" value. Apparatus to perform an N-bit truncation includes an incrementer, a two input AND gate and an N-input OR gate. Such an arrangement is rather complex but is suitable for use for applying symmetrical rounding in a luma/chroma separation application. A preferred symmetrical rounding unit 100A is shown in FIG. 1.

Symmetrical bit reduction or rounding, in the example of FIG. 1, is provided by rounding unit 100A. As an overview, in this unit an M-bit (e.g., 12-bit) chrominance signal, the MSB thereof and an integer K (e.g., 0111 in binary) are added to produce a sum which is truncated by N bits (e.g., 4 bits) to provide a symmetrically rounded or bit reduced digital output signal having "N" fewer least significant bits, LSB's. The MSB may be applied in true or complemented form to the adder for selecting wide or narrow rounding modes having different numbers of output zeros disposed about a point of symmetry for a given input signal change. Advantageously, undesirable DC shifts due to bit reduction in digital signals are prevented and this has been found to be effective in reducing luminance signal "contouring" as will be described.

In detail, in the example of FIG. 1, rounding unit 100A comprises a 12 bit full adder 101, a 4 bit truncation unit 103 and a binary number or bias source 102. In this embodiment the 12 bit chrominance component provided by filter 30 and a four bit bias number (e.g. digital "7" or binary "0111" in binary) are applied to the addend and augend inputs of adder 101. In this example employing "two's complement arithmetic", the most significant bit (the sign bit) of the 12 bit chrominance signal is applied to the carry-in input of the 12 bit full adder 101 which, with its carry out, provides a 13 bit chrominance signal. The four LSB's of the modified chrominance signal are truncated by a 4-bit truncator 103 thereby producing a 9-bit symmetrically rounded chroma output signal for unit 100A. Stated another way, in unit 100A a number is added to the chrominance signal during symmetrical rounding dependent on the polarity of the chrominance signal. If the signal is positive, only the "0111" (decimal "7") value is added and the MSB applied to the carry-in of adder 101 is a zero. For negative numbers, a value of "1000" (decimal "8") is effectively added since the MSB applied to the carry-in of adder 101 will be "1" and will be added with "0111" to the input signal.

To understand symmetrical bit reduction as shown in FIG. 1, it is helpful to consider the tables of FIGS. 13 and 14 which illustrate "wide" and "narrow" modes of symmetrical rounding, respectively. The wide mode is used in unit 100A. FIG. 13 illustrates a case where two bits are to be rounded using the apparatus of unit 100A for signal levels ranging from −11 to +11. Column (a) lists the input signal values in decimal. Column (b) shows the binary input signal equivalents. Column (c) shows the MSB of the binary input signal. Column (d) presents a formula for determining the magnitude of the number "K", provided by binary bias source 102, which is added to the input number and the MSB thereof in full adder 101. From the formula $(K=\{(2^N)-2\}/2)$, the value of K for a reduction of 2 bits (N) equals "one".

Column (e) illustrates the output of the adder 101 for the sum of "M", "K" and "MSB" for the input signal from −11 to +11 (decimal). When these sums are truncated by two bits, the resultant truncated values, as shown in columns (f) and (g) range from −3 to +3 and are all symmetrical about zero of the input signal. The "step sizes" comprises four identical output values per step above or below the zero level. For symmetry about zero, there are a total of five zeroes that are symmetrically disposed relative to zero of the input signal (hereinafter, the "point of symmetry" or POS).

It will be noted that in unit 100A, where 4 LSB's are removed, there is a possibility of a MSB overflow or carry-out and so the total number of bits reduced is 3 so that the 12 bit input signal would be reduced to 9 bits, not the 8 bits ultimately desired. To avoid this condition, the MSB of the output signal of unit 100A is limited by limiter 104.

The "narrow" mode of symmetrical bit reduction is illustrated in the example of FIG. 3 by unit 100B and its operation is shown by the table of FIG. 14. The only difference between units 100A and 100B is that in unit 100B the MSB applied to the adder is inverted by inverter 300. The effect on the operation of unit 100B is a reduction in the number of output zeroes disposed about the point of symmetry of the input or output signals. In FIG. 14, the narrow mode example, in which the MSB is applied in complemented form (inverted) to the adder, there are three zeros produced at the point of symmetry. In FIG. 13, the wide mode example, in which the MSB is applied in true (non-inverted form) form to the adder, there are five zeros produced at the point of symmetry as previously noted. Advantageously, one has the option of widening or narrowing the "zero crossing point" of the symmetrically bit reduced output signal.

Returning now to the problem of luminance signal recovery in FIG. 1, the foregoing rounding-off process may increase the number of bits of the chrominance signal to 13 for the reasons previously explained. This may appear to be opposite to what is needed for extracting the luminance component from the composite video signal CV. However, since the round-off circuit has effectively moved whatever chrominance information from the lower 4 bits that was useful and placed it in bit 5 and above, it is now possible to truncate the lower 4 bits without significant loss of the chrominance information whereby the luminance contouring effect is substantially reduced.

Summarizing, to this point, the symmetrical bit reduction is provided by adding M, K and the MSB and truncating the sum by a four bit truncator 74 This reduces the number of LSB's of the chrominance signal by four and increases the number of MSB by 1 resulting in a total of 9 bits. This is only one more than the resolution of the composite video signal (8 bits). This last bit is removed by limiter 104 to produce an 8 bit chrominance output signal. The process of limiting after symmetrical rounding does not degrade the contouring performance of the overall system but will facilitate subtraction with the 8 bit composite video signal without having to discard an LSB. In other words, it has been found that it is non-symmetrical truncation of chroma least significant bits that leads to the problem of luma contouring and so the limiting of the most significant bit of the chrominance signal does not degrade contouring performance but does facilitate the later 8-bit subtraction for luma recovery.

Recovery of the luminance signal component is provided by subtractor 80 which subtracts the 8 bit chrominance signal at its subtrahend input 84 from the composite video signal CV at its minuend input 82. Before subtraction, the composite signal CV is delayed by 4 sample intervals in delay unit 86. The reason for delaying the composite video signal by one full color cycle (4 sample intervals) is to provide temporal alignment with the 12 bit chroma signal which has been delayed by an average of 4 sample intervals in band pass filter 30. Note that "subtraction" in digital circuits is usually performed by means of two's complementing the subtrahend and then performing addition and so the term "subtractively combining" as used herein and in the claims is intended to include such conventional subtraction techniques.

The arithmetic operation of subtractively combining the composite and chrominance signals produces a separated luminance component with a one bit extension to 9 bits (because of the possibility of a luminance "borrow" result of the subtraction). This extra bit is suppressed by limiting the separated luminance signal Y to 8 bits in limiter 90. An analog luminance component output signal is obtained by applying the limited 8 bit luminance component to output terminal 94 via an 8 bit digital to analog (D/A) converter 92.

Consideration will now be given to operation of the example of FIG. 1 in separating a luminance component from what will herein be called a "contouring-sensitive" signal. Five examples of contour sensitive signals are illustrated in FIG. 5 by the signals labeled "signal one" to "signal five". Each signal is a composite video signal taken at the output of A/D converter 14 and having an AC component representing the chrominance at a frequency of the color subcarrier (Fc) and a DC component. The DC component represents the luminance component and will be constant for at least several subcarrier cycles. The five signal lines illustrate five different steady-state conditions of a luminance signal representing five different but "nearly equal" luminance values in 5 contiguous regions of a displayed video image. Although the analog chroma into A/D converter 14 is selected to be constant, the "digital chroma" at the output of A/D converter may not be because changes in the luma, when added to chroma and quantized, can produce changes in the digital separated chroma.

It will be noted from the table of FIG. 5, that a change from "Signal One" to "Signal Two" is a change in only one of the four composite values. Specifically, the composite value of "9" appearing in each line of Signal One changes to "10" in each line of Signal Two. The values given are illustrative and may be considered as IRE units or IRE units converted to an 8-bit binary scale (e.g., 0–255). For either expression, the change from Signal One to Signal Two is very small. The same is true for the change between Signal Two and Signal Three ("4" changes to "5" in each line); the change between Signal Three and Signal Four ("2" changes to "3" ) and between Signal Four and Signal Five ("7" changes to "8" ). These changes between the five assumed signals represents a nearly constant slowly increasing luminance component of the composite video signal and a constant chrominance component.

FIG. 6 illustrates the chrominance (C) and vertical detail (VD) components recovered from the output of comb filter 20 for the five lines of composite video of FIG. 5. These values are steady state values calculated from the equation for "D" (difference) in the heading of FIG. 6. Specifically, the value of a current C+VD sample equals the value of the present sample minus that of the immediately vertically preceding sample (i.e., the corresponding sample of the previous line). For example, for Signal One the first sample difference for line 2 in FIG. 6 is equal to the value (+4) of the current sample of Signal One line 2, minus the value of the corresponding previous sample of Signal One in line 1 ("−7" ) taken from FIG. 5. All of the C+VD difference values of FIG. 6 are derived in the same manner from FIG. 5.

The next processing step, as previously explained with regard to FIG. 1, is to remove the unwanted vertical detail from the comb filter 20 output. This is done by band pass filter 30 having the transfer function for "Pn" shown in the heading of FIG. 7 for deriving the filtered values of the combed composite signal from the comb values of FIG. 6. The value "Pn" for a current filtered "pixel" of chroma equals the current value (Po) of the corresponding pixel in the table of FIG. 6, minus 2 times the value two pixels earlier in time, plus 2 times the value 4 pixels ahead, minus 2 times the value six pixels ahead and plus the value eight pixels ahead in time.

As an example, the value of the band pass filtered chrominance signal for Signal One, line 3, pixel 1 is determined as follows. The current value is +3, two pixels ahead the value is −3, four pixels ahead (of the current value) the value is +3, six and eight pixels ahead have values of −3 and +3, respectively. The value of Pn thus becomes:

$$Pn=(+3)-2(-3)+2(+3)-2(-3)+3 =3+6+6+6+3=+24 \qquad (1)$$

The remaining values of the chrominance pixels of FIG. 7 are calculated in the same manner.

To more fully appreciate the advantages of the present invention, it is believed helpful to now determine what the luminance component values would be if they were obtained by simply truncating 4 bits from the 12 bit chrominance signal provided by filter 30 and subtracting the difference from the composite signal CV. These results are presented in the tables of FIGS. 8 and 9. The results obtained from FIG. 9 for simple truncation will then be compared with FIG. 11 which provides the results for symmetrically rounding the chrominance signal.

FIG. 8 illustrates the effect of "simple" truncation (not symmetrical) of 4 bits from the 12 bit chrominance signal of filter 30. FIG. 9 illustrates the ultimate result on the luminance signal of subtraction of the truncated chroma values of FIG. 8 from the original composite video values of FIG. 5. As will be seen, substantial contouring results in the luminance signal where "simple" truncation is applied to the chrominance signal. The truncated chrominance values using the conventional "simple" truncator 200 of FIG. 2 are determined by dropping the four least significant bits from the composite video values of FIG. 7. The results are shown in FIG. 8.

FIG. 9 illustrates the luminance signal levels for the assumed condition of simple truncation of 4 bits from the 12 bit chrominance signal. In this array, there is only one signal that has the correct luminance value, that signal is Signal Three. FIG. 9 is derived by subtracting each truncated chrominance value of FIG. 8 from the original digital composite video signal values of FIG. 5. For example, the value of the first luma pixel in FIG. 5 at line 2 of Signal Three equals the composite video value from FIG. 5 minus the chrominance value from FIG. 8. From FIG. 5 the composite video value CV equals "7". From FIG. 8 the truncated chrominance value is "–1". Accordingly, for Signal Three, line 2, pixel 1, the luminance signal value equals "6". This is the "correct" value for the luminance signal as explained below.

To determine which luminance signal values of FIG. 9 are correct for luma and which are not, it is helpful to examine the filtered chrominance values of FIG. 7. There it is seen that for pixel 1 line 3 Signal Three, the filtered chroma value is "16" or "10000" in binary. When "10000" in binary is truncated there is no division error because the 4 LSB's that are discarded are all zero. Thus, all pixels in FIG. 7 which equal +16 or –16 or any integer multiple thereof have undistorted values of chroma and so the corresponding pixel positions in FIG. 9 have correct values of the luminance component. For example, every pixel in lines 2 and 3 of Signal Three in FIG. 7 is either 16 or a multiple thereof (64) so all pixels of Signal Three, lines 2 and 3 are correct. The remaining signals all contain chroma errors due to truncation and thus luma errors as well and this can lead to an undesired contouring effect when the components are ultimately displayed. In addition to the foregoing, Signals One and Five contain the exact same chroma but the luma differs by one count or signal level. Between these two signal levels (6 and 7) there is only one intermediate luma value produced, and that is from Signal Four. This output may be viewed as a luma level of 6.5 (averaged).

FIGS. 10 and 11 illustrate the chrominance and luminance separation performance of the present invention and are derived from FIGS. 5, 6 and 7 using essentially the same methods as in FIGS. 8 and 9 except, of course, that here the 12 bit chrominance signal from filter 30 is subjected to symmetrical rounding prior to subtraction from the composite video component rather than being simply truncated. The effects of this treatment of the chrominance signal on the recovered luminance component will now be compared with the truncation example of FIG. 9.

First, it will be noted that the average luminance output shown in FIG. 11 is always equal to the average of the composite video. This is superior to the simple truncation example of FIG. 9 which produces an unchanging video signal for several signal regions even though the luminance level (from one signal level to another) is changing. Also, in the example of FIG. 1, each change in the input steady-state signal value produces a different average luminance output level. Three quarters of the time there is a residual subcarrier Fc component left in the luma but, in general, the appearance of contouring in the example of the invention will be less than that employing straight truncation due to greater luma accuracy for each of the five regions represented by the signals 1–5.

Figure 12:
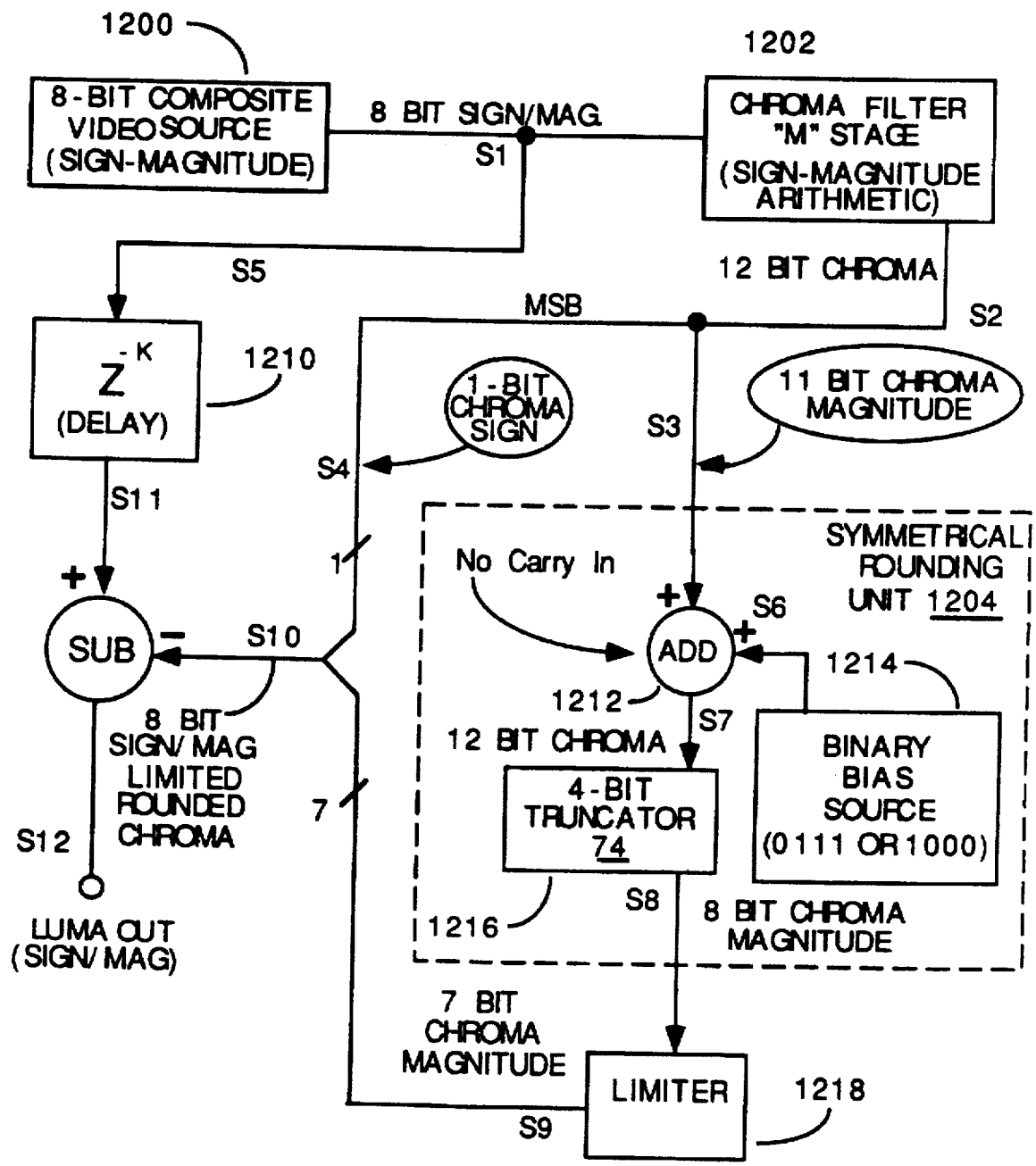
FIG. 12 is a block diagram of a further example of for separating a digital composite video signal into luminance and chrominance components using symmetrical bit reduction with sign-magnitude arithmetic processing in accordance with a further aspect of the invention.

FIG. 12 illustrates an application of the invention for providing luma/chroma separation with symmetrical rounding implemented using sign-magnitude arithmetic processing. In FIG. 12 source 1200 provides an 8-bit composite video signal S1 in sign/magnitude form to a chrominance filter 1202 which separates the chrominance component producing, illustratively, a 12 bit filtered chrominance signal S2. The magnitude bits S3 of this signal are reduced to 8 magnitude bits S8 by symmetrical rounding unit 1204 and to 7 magnitude bits S9 by limiter 1218. The sign bit S4 of the 12 bit chroma signal S2 and the 7 magnitude bits S9 are subtracted in subtractor 1208 from the composite video signal S5 (after processing delay 1210) to provide a separated luma output signal S12. The rounding unit 1204 in this example operates only on the magnitude bits and comprises an adder 1212 which adds a binary bias signal S6 from source 1214 to the 11 bit chroma magnitude signal S3 to form a 12 bit chroma signal S7. The four least significant bits LSB's of signal S7 are truncated by a truncator 1216 and limited by limiter 1218 for application along with the sign bit S4 to the subtractor 1208. Since the four least significant bits of the magnitude signal are symmetrically reduced, the reduction does not introduce a DC component into the resultant signal and so contouring effects in the separated luminance signal are avoided.

Figure 15:
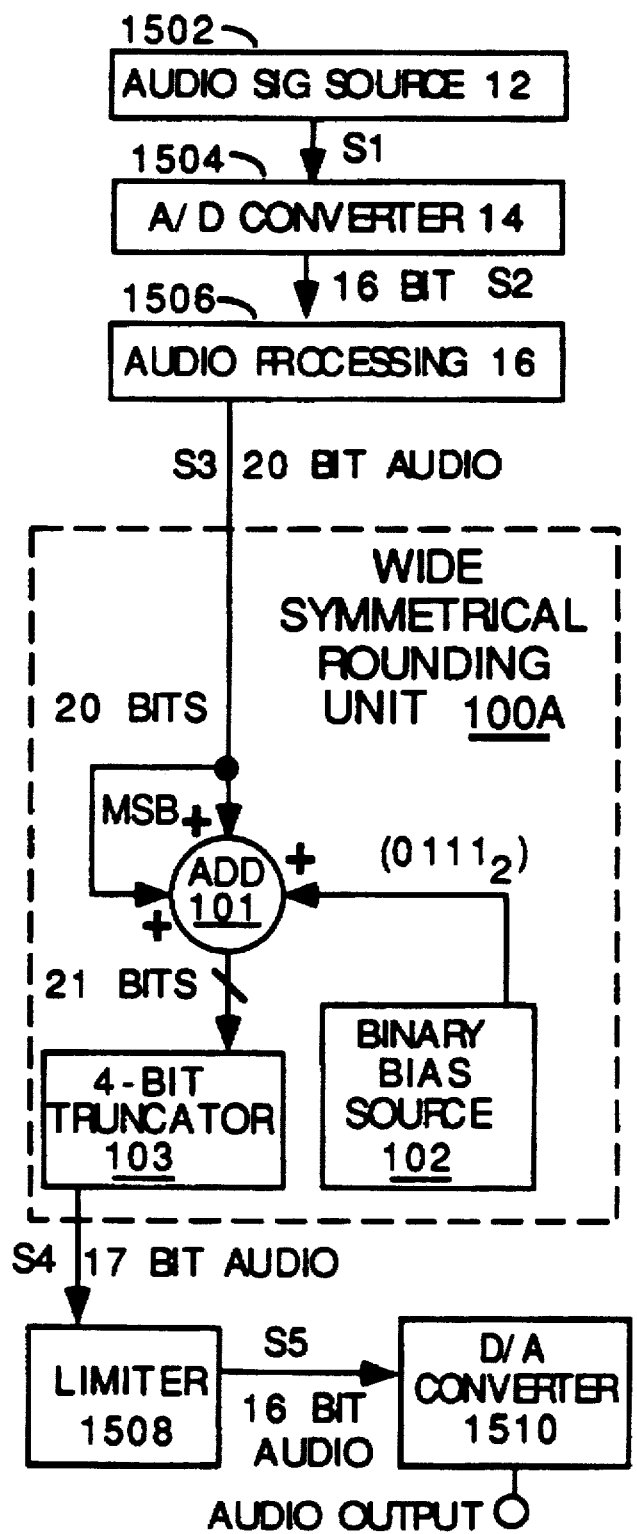
FIG. 15 is a block diagram illustrating wide symmetrical rounding with limiting in an audio signal processing application.

FIG. 15 illustrates an application of the invention for providing symmetrical bit reduction or rounding in an audio processing system. The system comprises and audio source 1502 for providing an analog audio signal S1 to an analog-to-digital converter 1504 which produces a 16 bit digital output signal S2 to an audio processing unit 1506. The processing may comprise, illustratively, filtering, noise reduction or the like and will be assumed to increase the number of bits to 20. To reduce the number of bits to the original 16 bits of signal S2, the 20 bit signal is applied to a rounding unit 100C which is similar to that of trait 100A in FIG. 1 except that here the signal is of 20 bits rather than 12. The rounding unit operates as previously described to produce a 17 bit signal S4 in which 4 bits have been reduced by symmetrically removing the 4 least significant bits and one bit has been added to allow for an overlow in the MSB bit position from adder 101. The resultant 17 bit signal S4 is limited to 16 bits by limiter 1508 and the limited signal S5 is converted back to an analog signal S6 a by a digital to analog converter 1510.

Other modifications may be made to the embodiments within the principles of the invention as recited in the appended claims. For example, with regard to the luma/chroma separation application of the invention, the filtering may be of differing types necessitating rounding off more than four or fewer than four chrominance bits. The same is true with regard to audio processing. Also, although a one line (1-H) comb filter has been used as an example, the chrominance filter may be a more comples comb such as a two-line (2-H) comb or a frame comb. Although rejection of the vertical detail output of the comb is illustrated as being provided by a three stage band pass FIR chrominance signal filter, other suitable filters may be used having more or fewer stages of differing levels of complexity. Also, the other chrominance filters may be of the high pass type or a combination of high-pass and band-pass types.

What is claimed is:

1. Apparatus for symmetrically reducing a given number N of least significant bits of an M-bit input signal comprising:

adder means for adding the M-bit input signal, the MSB thereof and an integer K to produce a sum signal; and means for truncating the sum signal by N bits to provide a symmetrically rounded output signal having N fewer least significant bits; and means for applying said MSB to said adder means in complemented form.

2. Apparatus as in claim 1 wherein said integer K applied to said adder means is related to N, the number of least significant bits to be reduced, by the relationship $K=\{(2^N)-2\}/2$.

3. Apparatus as in claim 1 wherein M=12 and N=4 and said integer K equals "seven".

4. Apparatus as recited in claim 1 further comprising a limiter for limiting said symmetrically rounded output signal.

5. Apparatus for symmetrically reducing a given number N of least significant bits of an M-bit input signal comprising:

a binary bias source for providing a constant, K, equal to $\{(2N)-2\}/2$ wherein N equals the number of least significant bits to be reduced;

a full adder having a first input to which said constant K is applied, having a second input to which said M-bit input signal, including an MSB thereof, is applied and having a third input to which said MSB is applied with inversion and having an output for providing a sum signal;

means for truncating N least significant bits of said sum signal to provide a symmetrically rounded signal; and means for limiting said symmetrically rounded signal to provide a processed output signal of N fewer least significant bits and having a total of M-N bits.

6. Apparatus for symmetrically reducing a given number N of least significant magnitude bits of an input signal of sign-magnitude form having M magnitude bits and a sign bit, comprising:

a binary bias source for providing a binary constant K related to said number N of least significant magnitude bits to be symmetrically reduced;

adder means for adding the M magnitude bits and the binary constant K to produce a sum signal;

means for truncating the sum signal by N bits to provide a processed output signal having N fewer least significant magnitude bits; and means for limiting said processed output signal, without alteration of said sign bit, to produce a modified output signal of sign-magnitude form having M-N+1 bits.

* * * * *